July 4, 1967 — J. M. GORDON — 3,329,143
SHRINKABLE PLASTIC BANDAGE COVER
Filed April 2, 1964
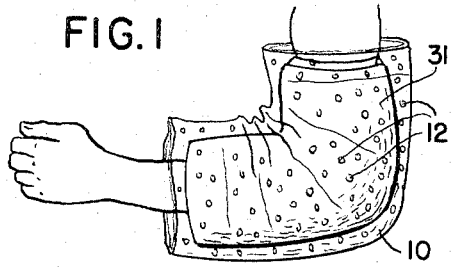
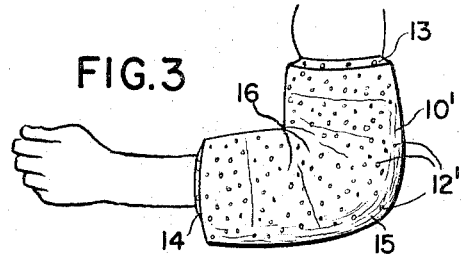
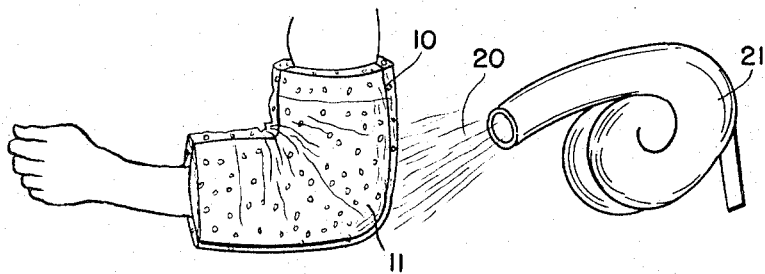
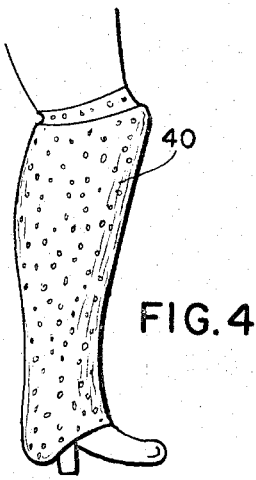
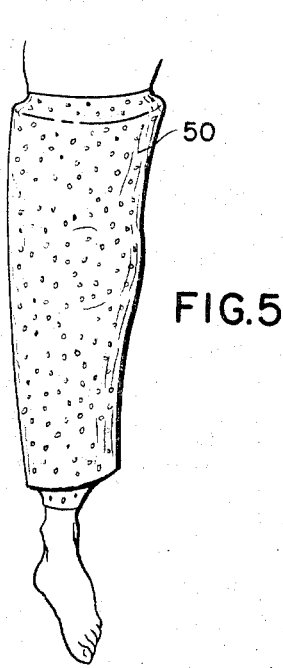
INVENTOR.
Joseph M. Gordon
ATTORNEYS.

United States Patent Office 3,329,143
Patented July 4, 1967

3,329,143
SHRINKABLE PLASTIC BANDAGE COVER
Joseph M. Gordon, 60 Sutton Place S.,
New York, N.Y. 10022
Filed Apr. 2, 1964, Ser. No. 356,841
6 Claims. (Cl. 128—82)

This invention relates to a plastic bandage cover which is shrinkable into place over a cast or bandage to protect the bandage from being contaminated by dirt, grease, liquids, etc., without undesirably constricting the bandage itself about the injured part which the bandage covers.

This application is a continuation-in-part of U.S. application Ser. No. 230,851, filed Oct. 16, 1962 now abandoned.

Bandages and casts which are left for any length of time on the inpured parts of the body soon become unsightly due to the dirt which they attract and may even become contaminated by liquids, greases, etc. It is impractical to make a bandage of waterproof and stainproof material. The well-known finger cots, made of rubber or similar elastomeric material, are of limited size, usually unnecessarily bind the fingers and are uncomfortable due to their lack of porosity and binding characteristics.

Among the objects of the present invention is to provide a cover for bandages and casts which is readily applied, is resistant to dirt and liquids, and is porous.

Among other objects of the invention is to provide a shrinkable, porous, plastic sleeve which when shrunk onto a bandage or cast protects the same from dirt and other contaminants.

Among other objects of the invention is to provide a porous, plastic sleeve for covering and protecting bandages and casts which can be shrunk to tightly fit about the bandage or cast without undesirably binding or constricting the bandage or the body of the person wearing the bandage.

The objects of the invention are obtained by providing a prestretched tube of thermoplastic film material of the type having an elastic memory which manifests itself upon the application of heat. The film which forms the tube is prestretched circumferentially and set so as to be shrinkable circumferentially upon the application of heat. Although the tube may also have been stretched longitudinally as well as circumferentially to form "biaxially oriented" films. The film is either selected to be porous to air or is made porous in a suitable way. Many thin thermoplastic films are porous to air especially when uncoated. For example, polystyrene film has a porosity sufficient to permit the escape of moisture or similar vapors from a cast or bandage. If desired, the film may be formed to contain minute invisible pores. On the other hand, relatively large pores or opening may be made in the stretched film. When the stretched film is perforated to contain either pin hole size pores or larger perforations, the size of the pores decrease on shrinkage of the film. The tube may be formed by a tubular extrusion process, or it may be formed by uniting the opposite edges of a continuous film.

It has been found, however, that most prestretched films require the application of heat at around 320° F. to make them shrink. The application of such heat close to the area where the flesh is exposed at the edge of the bandage can cause discomfort and even severe burns. It has now been found that a relatively highly plasticized prestretched film of vinyl chloride type polymers, containing 14–19% of plasticizers such as approved by the Food and Drug Administration, can be shrunk at much lower temperatures of 140°—about 180° F. The polymers of vinyl chloride which may be employed include not only the homopolymers of vinyl chloride but the copolymers thereof with vinyl acetate, vinylidene chloride, vinyl maleate, vinyl butyrate, vinyl acrylate, all of said copolymers containing at least about 50% of vinyl chloride. Since said copolymers contain about 50% of vinyl chloride, it is believed proper to refer to homopolymers and copolymers broadly as "vinyl chloride polymers."

The plasticizers suitable for these vinyl films which also have Food and Drug Administration approval comprise dioctylphthalate, acetyl tributyl citrate, acetyl triethyl citrate, triacetin butylphthalylbutylglycollate, dibutyl sebacate and ethyl phthalyl ethyl glycollate.

To be shrinkable at the low temperatures specified, the vinyl chloride polymers should contain at least 14% of said plasticizers. Such polymers are characterized by their ability to tolerate high proportions of plasticizers, however, when the film contains over about 20% of such plasticizers, it becomes soft and pasty so that pores or holes can be formed therein only with great difficulty. Also, with the higher proportion of plasticizers the film lacks the required tensile strength when it is shrunk.

One feature of the invention is based on the discovery that such a perforated prestretched sleeve of film can be slipped over a bandage or cast and then heated to shrink the same onto the bandage or cast by the hot air blast of the familiar type of heating device used to dry hair or the hands and without any discomfort to the wearer of the bandage. When the bandage is shrunk, the openings in the same become smaller, but even if the openings are invisible, the resultant shrunk film is still porous to air and moisture. In shrinking, the bandage cover adapts itself to bends in the arm, for example, and to conical irregular shapes of the bandaged parts without unnecessarily binding any part.

In the drawing:

FIG. 1 is a side view of a prestretched sleeve as it is applied to an elbow bandage.

FIG. 2 is a view illustrating how the sleeve of FIG. 1 is heated to shrink the same.

FIG. 3 is a view illustrating how the bandage cover of FIG. 1 looks after shrinking.

FIG. 4 is a view showing a similar type of bandage cover applied to the lower limb.

FIG. 5 is a view showing a similar type of bandage applied to a bandage covering the knee.

The tube 10 of FIG. 1 is prepared by extruding a polyvinyl chloride resin, as described above, in tubular form and expanding the tube from the inside to stretch the same circumferentially. Machines for stretching extruded tubes in this way by internally trapped fluid pressure, for example, are known in the art and need not be described here. The extruded tube preferably has a thickness of 0.5 to about 3 mils or more and is stretched about 20 to 50% in the circumferential direction. The stretched tube can be set merely by cooling while in the stretched condition. Owing to the considerable amount of potential shrinkage of such tubes, only a few sizes need be prepared for arms, lower limbs, thighs, etc., respectively. If a non-porous film is selected, the film or tube is perforated subsequent to stretching. The tubes may be perforated prior to stretching, but as a rule, the stretching of an unperfroated tube is more readily performed and there is the possibility that where the tube or film is perforated prior to stretching, a perforation containing a corner can initiate splitting of the film during stretching so that less care as to the size and shape of the perforations is required when the films are perforated after stretching.

In employing the device of the invention, a sleeve or tube 10 is selected to fit loosely over the bandage 31 to be covered. As shown, the cover 10 contains a plurality of holes or pores 12. The holes not only provide breathing pores for the cover, they also prevent entrapment of air between the bandage and the cover. After the cover 10 has been slipped over the bandage 31, heat is applied as by means of a blast of air 20 from a hair drying type of device 21. The cover 10 shrinks under the influence of heat to the shape 10' shown in FIG. 3. In this cover 10', the ends 13 and 14 shrink to cover the corresponding ends of the bandage. The openings 12' become smaller. The bends at the tip 15 of the elbow portion of the bandage is covered by a smooth portion of the bandage and the wrinkles in the inside portion 16 of the elbow are substantially eliminated.

Due to its high degree of potential shrinkage, the bandage cover of the invention can smoothly cover practically any type of bandage or cast. FIGS. 4 and 5 show bandage covers 40 and 50 respectively, which cover casts on the lower leg and knee of a patient. Various other kinds of bandages may be covered in a similar way. The limited thickness of the cover of 0.5 to 3 mils, for example, reduces the cost of the material used to form the cover. At the same time, the bandage cover of the invention does not shrink beyond the limits necessary to form a compact covering about the bandage. Thus, the bandage cover shrinks only when in a heated state and in this heated state, it is still too plastic to produce any binding effect, so that although this cover will shrink to closely cover the surface of the bandage or the body parts extending beyond the bandage, it will not shrink to bind such body parts.

The following example illustrates the process:

A commercially available biaxially oriented prestretched film, about 1 mil in thickness and comprising 84% of a copolymer of 90 parts vinyl chloride and 10 parts vinyl acetate and 16% of dibutyl sebacate is treated to form therein a multiplicity of spaced perforations about 1 mm. in diameter and spaced about 3 cm. apart. The perforated film is heat sealed along opposite edges to form a tube about 2.5 cm. in diameter. When cut to lengths of about 5–7 cm., these tubes are suitable for shrinking over a finger bandage. The tube is placed over such a bandage and heated to 150° F. The heating can be carried out by the blast of air from a hair drying device. Also, the heat obtained by holding an ordinary, lighted, pocket cigarette lighter several inches from the bandage is adequate. The flame of such lighter is obviously much greater than 150° F. but the radiant heat at the distance of a few inches from such lighters is not harmful or uncomfortable.

The features and principles underlying the invention described above in connection with specific exemplifications will suggest to those skilled in the art many other modifications thereof. It is accordingly desired that the appended claims shall not be limited to any specific feature or details thereof.

I claim:

1. A bandage and cast cover for protecting such bandages and casts against dirt and other contaminants comprising a tubular film or thermoplastic, vinyl chloride polymer material containing 14–19% of plasticizer, said film having a multiplicity of pores therein substantially equally spaced over the surface of the film, said film being circumferentially expanded and having an elastic memory responding to the application of heat at 140–180° F. whereby said tube may be loosely slipped about the bandage to be covered and heated to cause the same to shrink about the bandage and cover the same without discomfort.

2. A bandage and cast cover as claimed in claim 1 wherein the thickness of said film is about 0.5 to about 3 mils.

3. A bandage or cast cover as claimed in claim 1 wherein the tubular cover is a seamless tubular film.

4. A bandage or cast cover as claimed in claim 1 wherein said tubular film has a longitudinal seam therein.

5. A process of protecting a bandage or similar cloth body of irregular shape from contamination by dirt comprising providing a circumferentially expanded tube of thermoplastic vinyl chloride polymer film having an elastic memory responding to the application of heat at about 140–180° F., and containing a multiplicity of pores substantially equally spaced over the surface of said tube, slipping the tube over a bandaged part of smaller circumferential dimensions than said tube, and heating the tube to about 140–180° F. to shrink the same onto said bandage whereby said heat shrinks the tube onto said bandage and said perforations prevent entrapment of air between the tube and the bandage.

6. The process as claimed in claim 5 wherein said tube is heated by a blast of heated air at about 140–180° F.

References Cited

UNITED STATES PATENTS

| | | | |
|---|---|---|---|
| 2,027,961 | 1/1936 | Currie | 264—230 |
| 2,195,233 | 3/1940 | Boyer | 264—230 |
| 2,438,901 | 4/1948 | Coxe | 2—21 |
| 2,545,243 | 3/1951 | Rumsey | 264—230 |
| 2,581,561 | 1/1952 | Shaw | 264—230 |
| 2,609,539 | 9/1952 | Shearer | 264—342 |
| 2,751,629 | 6/1956 | Dick. | |
| 2,793,399 | 5/1957 | Gallay et al. | 264—230 |
| 3,017,729 | 1/1962 | Cheeley. | |
| 3,045,285 | 7/1962 | Baird et al. | 264—230 |

RICHARD A. GAUDET, *Primary Examiner.*

J. W. HINEY, *Assistant Examiner.*